May 25, 1948.                    A. J. DOLAN                    2,441,995
                              POWER FACTOR CONTROL
                         Filed Jan. 13, 1945         2 Sheets-Sheet 1
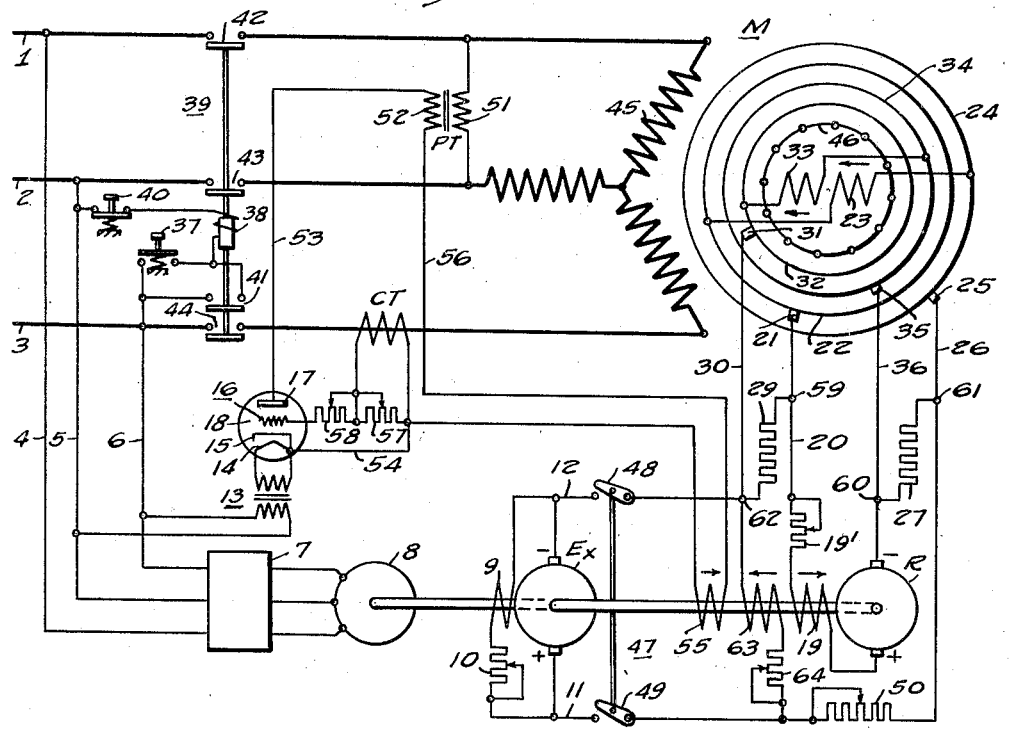
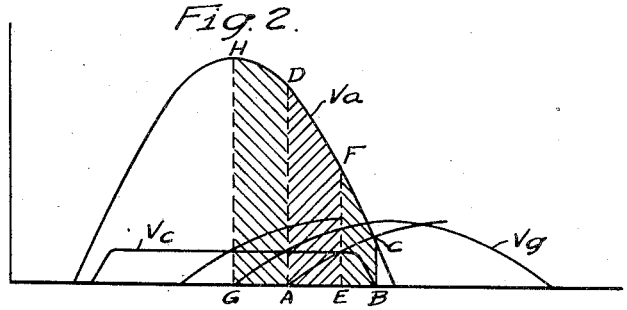
WITNESSES:                                                    INVENTOR
                                                           Alpheus J. Dolan.
                                                              BY
                                                                  ATTORNEY INVENTOR
Alpheus J. Dolan.

Patented May 25, 1948

2,441,995

UNITED STATES PATENT OFFICE 2,441,995

POWER FACTOR CONTROL

Alpheus J. Dolan, Wilkinsburg, Pa., assignor to Westinghouse Electric Corporation, East Pittsburgh, Pa., a corporation of Pennsylvania Application January 13, 1945, Serial No. 572,670

7 Claims. (Cl. 322—20)

My invention relates to electric systems of control and more particularly to systems of control for controlling the excitation of synchronous dynamoelectric machines.

Various methods and apparatus have heretofore been proposed to control the excitation of synchronous dynamoelectric machines but the apparatus heretofore in use is complicated, expensive and often unreliable.

It is an object of my invention to provide simple and efficient means for exciting a synchronous dynamoelectric machine as a function of a fixed voltage and the voltage and load current of the machine.

Another specific object of my invention is the provision of a regulating generator, connected to the terminals of a balanced Wheatstone bridge, for varying the excitation of a synchronous dynamoelectric machine by alterations of the voltage of the regulating generator as a function of changes in power factor of the synchronous dynamoelectric machine.

A still further object of my invention is the provision of regulating the output voltage of a regulating generator from zero voltage either in a positive sense or in a negative sense as a function of the variations of the power factor of a synchorous dynamoelectric machine from a selected power factor to a power factor more lagging or to a power factor more leading with respect to the selected power factor.

Another broad object of my invention is to maintain constant power factor of a synchronous machine.

A more specific object of my invention is the provision of electronic means controlled by the voltage and load current of a synchronous motor to so control the excitation of the motor as to maintain any selected power factor for the machine.

The objects hereinbefore stated are merely illustrative of the objects of my invention. Many other objects and advantages of my invention will become more apparent from a study of the following specification and claims, when made in conjunction with the accompanying drawing, in which:

Figure 1 is one diagrammatic showing of my systems of control as applied to a synchronous motor;

Fig. 2 shows some curves of aid in the description of my invention;

Figure 4:
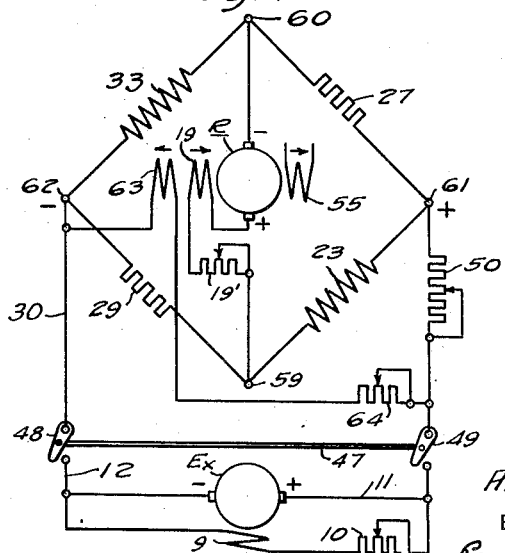
Fig. 4 is a simplified diagrammatic showing of certain features of my invention.

In Fig. 1, M designates a synchronous motor, the excitation of which is to be controlled, disposed to be connected to the alternating current buses 1, 2 and 3 by the electromagnetic line contactor 39. The synchronous motor is provided with two field windings 23 and 33 brought out to four slip rings so that the two windings may be connected in two legs of a balanced Wheatstone bridge shown more clearly in Fig. 4.

A suitable constant voltage exciter Ex provides a selectable fixed excitation to the motor field windings for a selected load. The adjustment of the exciter voltage and field circuit resistance of the fields 23 and 33 may be such as to provide unity power factor or any other power factor value selected for a given load on the motor.

I connect a regulating exciter, or generator to the terminals 59 and 60 of the Wheatstone bridge. The regulating generator is provided with a pattern field, providing a fixed excitation, and a boosting field and a series self-exciting field normally acting in opposition to the pattern field to such an extent that the output voltage is zero.

A thyratron tube 16 is so controlled that its plate current is a function of the power factor. The boost field is connected in the plate circuit of the thyratron tube and thus provides a current flow changing with the tube excitation.

The effect on the boost field is such that the excitation of the synchronous motor is increased if the power factor becomes more lagging and is decreased if the power factor becomes more leading. The effect of the control is to maintain constant power factor.

Figure 3:
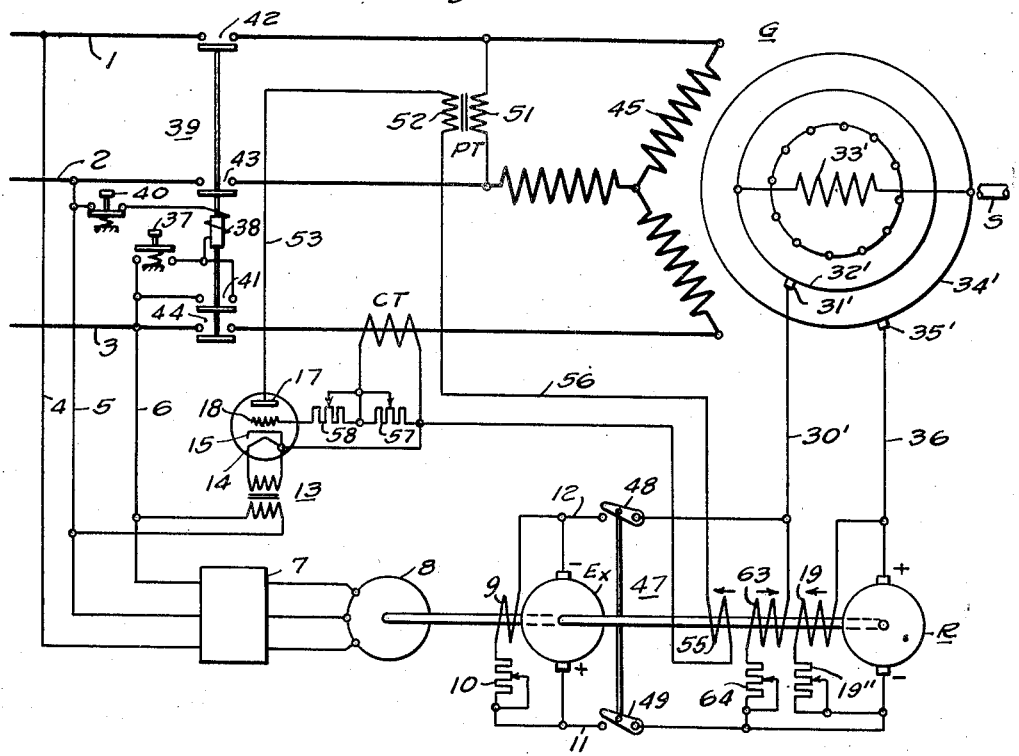
Fig. 3 is a diagrammatic showing of a modification of my invention.

The arrangement shown in Fig. 3 is for maintaining constant voltage on a synchronous generator with changes in voltage and load.

A better understanding of my invention can probably be had from a study of a typical operation of my system of control for maintaining or controlling the power factor of a synchronous machine. Reference may first be had to Figure 1, wherein my control is shown in conjunction with a synchronous motor. In starting this motor, main circuit breakers (not shown) are closed to energize the buses 1, 2 and 3. Energization of these buses establishing a circuit through conductors 4, 5 and 6 and controller 7 for the constant speed alternating-current motor 8 coupled to drive the exciter Ex and the regulating generator R. The exciter having the self-exciting field 9 and the adjustable rheostat 10 is self-excited and comes up to full voltage, so that buses 11 and 12 are energized with direct current voltage of a substantially constant value.

Another circuit is established from energized conductors 5 and 6 to the transformer 13 for energizing the filament 14 to heat the cathode 15 of the thyratron tube 16. This tube 16 is of the gas-filled type and becomes conducting with a discharge effect when the voltage between the plate, or anode, 17 and the cathode 15, as controlled by the grid 18, is of a suitable magnitude, determined by the critical voltage characteristic of the tube. It is, of course, well known that this discharge effect may be accomplished either by altering the voltage between the cathode and anode or by altering the phase relation of the voltages between the cathode or anode, or both. When the tube 16 is thus connected to the source of supply, before any circuits for the motor proper are established, the tube has ample time to heat up to be ready for the operation it is later called upon to perform.

It will be noted that the regulating generator, R, like the exciter, also comes up to its selected voltage since this regulator generator is provided with the self-exciting series field 19 and the pattern field 63. The circuit for this regulator generator may be traced from the positive terminal through the self-exciting series field 19, field adjusting rheostat 19', conductor 20, brush 21, to slip ring 22, field 23 of the synchronous motor, to slip ring 24 and brush 25, a conductor 26, balancing resistor 27, to the negative terminal of the regulator generator. Another circuit may be traced from the positive terminal of the regulator generator through the self-exciting field 19, field adjusting rheostat 19', conductor 20, balancing resistor 29, conductor 30, brush 31, slip ring 32, field winding 33 of the synchronous motor, slip ring 34, brush 35, and conductor 36 to the negative terminal of the regulator generator.

As soon as the exciter and the regulator generator are up to full speed, and the thyratron tube 16 has become heated, the synchronous motor may be started. This is accomplished by closing the starting switch 37 whereupon a circuit is established from bus 3 through starting switch 37, actuating coil 38 of the line contactor 39, stop switch 40 to the bus 2. Operation of the motor starting switch closes the contacts 41 which are disposed in parallel relation to the starting switch 37, and the line contactor, therefore, establishes its own holding circuit, and the starting switch 37 may be released. The line contactor also closes the contacts 42, 43 and 44, thereby connecting the armature, or stator winding, 45 of the synchronous motor M to the buses 1, 2 and 3. The motor thus starts as an induction motor on the damper winding 46. When the motor is up to full speed, by control forming no part of my invention, the field switch 47, having the contacts 48 and 49, is operated to connect the exciter to the field windings 23 and 33 of the motor. The synchronous motor thus synchronizes and is thus caused to operate at the desired synchronous speed.

The field circuit for the main field windings of the synchronous motor from the exciter may be traced from the positive bus 11 of the exciter Ex, through contacts 49, excitation adjusting rheostat 50, conductor 26, brush 25, slip ring 24, field winding 23, slip ring 22, brush 21, conductor 20, balancing resistor 29, and contacts 48 to the negative bus 12 of the exciter. The other field winding 33 is energized from the positive bus 11 of the exciter by a circuit which may be traced from this bus through contacts 49, field current adjusting rheostat 50, balancing resistor 27, conductor 36, brush 35, slip ring 34, field winding 33, slip ring 32, brush 31, conductor 30, contacts 48 to the negative bus 12 of the exciter. It will be assumed that the synchronous motor field windings 23 and 33 are energized in the direction, or sense, indicated by the full line arrows adjacent these fields.

In the showing in Fig. 1, the anode 17 of the electronic discharge tube 16 is connected to the output circuit, or secondary winding 52, of the potential transformer PT, having the primary winding 51 connected to one phase of the supply to the motor M. The circuit for the anode may be traced from the upper terminal of secondary winding 52 through conductor 53, anode 17, cathode 15, conductor 54, the pilot field 55 of the regulator generator R, and conductor 56 to the lower terminal of the secondary 52.

The potential transformer thus provides a reference voltage vector. The anode potential variations produced by this reference vector may thus be represented by the curve $V_a$ in Fig. 2. Curve $V_c$ represents the critical characteristic of the thyratron selected.

As is well known, the discharge of an electronic tube of this type can be controlled by changing the magnitude of the grid voltage or by changing the phase relation of the grid voltage with reference to the anode voltage, or may be controlled by both a change in magnitude and a change in phase angle taking place simultaneously. The curve $V_g$ in Fig. 2 represents the grid voltage.

To control the grid voltage as a function of the load current of the synchronous motor, I provide the current transformer CT. This current transformer is connected in the remaining phase of the synchronous motor and is provided with the loading resistor 57. This resistor 57 is shown adjustable but such adjustment would ordinarily be made at the factory and thereafter no adjustment is as a rule thereafter necessary provided the same type of tube 16 is always used for a given control. The terminals of the secondary of the current transformer in addition to being connected to the end terminals of the loading resistor 57 are connected respectively to the cathode 15 and grid 18 of the tube 16. This circuit may be traced from the left terminal of the loading resistor through the current limiting resistor 58, the grid 18, cathode 15, conductor 54 to the right-hand terminal of the loading resistor.

The resistance value of the loading resistor should be so selected as to give a maximum value of grid voltage as large as possible, considering, of course, the limitations of the thyratron tube. By selecting such large maximum value of grid voltage, changes in magnitude of the grid voltage have substantially no effect on the firing, or point of discharge, of the tube. The phase relation between the grid voltage and the anode voltage thus substantially alone determine the firing point of the tube.

The potential transformer PT, being connected across one of the phases of the synchronous motor, produces a fixed reference vector, whereas the output voltage, or secondary circuit voltage of the current transformer CT, in view of the high output voltage selected by a proper choice of the resistance value of the loading resistor 57, varies with the phase angle of the current of the synchronous motor. This means that the grid potential varies in phase relation to the anode potential in accordance with the power factor of the motor M. At unity power factor, the grid voltage leads the anode voltage by 90°. The tube will thus become conducting at point A (see Fig. 2) and remain conducting from point A to point B.

To effectively control, or maintain, as desired, the power factor of motor M, I divide the field into two parts, namely, into windings 23 and 33, using four slip rings, and connect the two fields 23 and 33 in opposite legs of a balanced Wheatstone bridge. This can best be seen from the somewhat abbreviated diagram shown in Fig. 4. The field windings are connected in two opposite legs of the bridge, the balancing resistors 27 and 29 are connected in the other two opposite legs of the bridge, and the regulator exciter R, with its adjustable tuning resistor 19′ and self-exciting field 19, is connected between the junction 59 disposed between field 23 and bridge balancing resistor 29 and the junction 60 disposed between the bridge balancing resistor 27 and field 33. The terminals of the exciter Ex are connected, respectively, to the junctions 61 and 62.

The regulator generator R in addition to the self-exciting field 19 and the pilot field 55 is provided with a pattern field 63. This pattern field 63 is connected to the exciter by the circuit that may be traced from the positive exciter bus 11 through contacts 49 of the field switch 47, adjustable resistor, or rheostat, 64, pattern field 63, conductor 30, contacts 48 of the field contactor 47 to the negative exciter bus 12.

Assuming the motor is in full operation at its normal load and normal excitation of the fields 23 and 33. Let normal excitation be such excitation as to produce unity power factor. To maintain unity power factor, I adjust the rheostat 64 for the pattern field 63 to such a value that the magnetomotive force of field 63 is equal and opposite to the combined magnetomotive forces of the pilot field 55 and the regulator self-exciting field 19. The pilot field 55 and the regulator self-exciting field 19 are wound to produce magnetomotive forces in the same direction whereas the pattern field 63 is wound to act differential with respect to fields 19 and 55.

Since the regulator generator is connected to the balanced voltage junctions 59 and 60 of the Wheatstone bridge, any voltage variations across junction 61 and 62 will not directly affect the output of the regulator generator R, but only as such voltage variation affects the power factor. It is thus apparent that it is always best, from a practical standpoint, to adjust rheostats 50 and 64 so that the actual voltage output of the regulator is zero when the excitation of fields 23 and 33 is normal.

Usually normal excitation of the fields 23 and 33 is such an excitation as to produce unity power factor. My system is, however, not limited to maintaining unity power factor. By suitable adjustment of rheostat 64, any power factor may be picked as the normal excitation and thereafter my systems of control will maintain that power factor. How this is effected will become apparent presently.

Assuming that at the power factor selected for the operation of the motor, the tube breaks down at point A, the current in the pilot field 55 will thus be determined by the current carried by the tube 16, namely, by the area under curve $V_a$ from line A—D to line B—C.

If for any reason the power factor changes, then the phase angle between $V_g$ and $V_a$ will change and thus the current in pilot field 55 will change, assuming that the power factor from any cause whatsoever becomes more lagging. This means that the phase angle between $V_a$ and $V_g$ becomes greater and $V_g$ shifts toward the right with reference to $V_a$. Tube 16 becomes less conducting since it will now carry only the current represented by the area under curve $V_a$ between lines E—F and B—C. The current in pilot field 55 is decreased. The effect of the pattern field thus predominates with the result that the regulator voltage is built up so that junction 60 becomes more positive and junction 59 more negative. The excitation of fields 23 and 33 is thus augmented from the regulator generator just sufficient to again establish the desired balance. The power factor is thus substantially unchanged except for the instantaneous change just sufficient to initiate the controlling effect.

If the power factor increases, the phase angle between $V_g$ and $V_a$ decreases and the tube breaks down at point G and the tube now carries the current determined by the area under curve $V_a$ between lines G—H and B—C. The effect of pilot field 55 now predominates so that the regulator generator is so excited that junction 59 becomes more positive and junction 60 more negative. The result is that fields 23 and 33 are subjected to a voltage effect just sufficient to eliminate the rise in power factor.

In the case of a synchronous motor, when the power factor becomes lagging and if the tube, connection and the relationship of the pilot field 55 and the pattern field are as shown, the average current in the plate circuit of the tube and in consequence the current in the pilot field will decrease and this will force the field current of the synchronous motor to a higher value until the power factor is restored to the selected value.

When the power factor becomes leading in a synchronous motor, and assuming the same connections hereinbefore explained, then the average tube plate current and thus the current in the pilot field will increase with the result that the field current of the synchronous motor will decrease until the setting of the pattern field rheostat is again satisfied, namely, the selected power factor is maintained.

My system of control is not limited to use with a synchronous motor, but machine M may be considered a generator. For generator operation of machine M, the regulator generator armature terminals have to be reversed. With the armature terminals reversed and the occurrence of a leading power factor, the angle between $V_a$ and $V_g$ decreases. This means the tube breaks down earlier and the pilot field current again increases but now the output of the regulator generator will increase the exciting current in fields 23 and 33 to thus restore the power factor to the selected value. When the power factor becomes more lagging, the angle between $V_a$ and $V_g$ increases with the result that the excitation of fields 23 and 33 is decreased until the selected power factor is again obtained.

For some applications, the use of four slip rings may not be desirable. When these conditions obtain, I arrange my system of control as shown in Fig. 3.

In Fig. 3, G represents a synchronous machine, as a generator, driven by shaft S from some prime mover, or electric motor. Many of the elements used in the control are the same and are designated by the same reference characters, and others that have corresponding elements in Fig. 1 are designated by primed reference characters. The Wheatstone bridge is not used. Instead of the bridge circuit, the regulator exciter R is connected directly in the field circuit of the single field winding 33′. The regulator generator thus operates somewhat like a booster generator but compensates the field excitation to maintain the power factor operation selected by the pattern field adjustment.

While I have shown but two embodiments of my system of control, it will be apparent that each modification is applicable to any synchronous machine whether generator or motor and that still other modifications may be devised without departing from the spirit of my invention. I, therefore, do not wish to be limited to the specific showings made but wish to be limited only by the scope of the claims hereto appended.

I claim as my invention:

1. In a system of control for a synchronous machine, in combination, a synchronous machine having polyphase primary windings and field windings, electric power transmitting leads and means for connecting the power leads to the primary windings, a source of direct current and means for connecting the field windings to the source of direct current, a thyratron tube having an anode, a grid, and a cathode, said anode and cathode being connected to be subject to the voltage across one phase of said power leads, a current transformer in one of the load lines of the synchronous machines, said grid being interconnected with the current transformer, means for adjusting the grid voltage in relation to the anode and cathode voltage whereby the plate current varies as a function of the phase relation between the current and voltage of the synchronous machine, and means for modifying the excitation of the synchronous machine as a function of the plate, or anode, current of the thyratron tube.

2. In an electric system of control for a synchronous machine, in combination, a synchronous machine having a polyphase primary winding and having field windings for excitation by direct current, electric power transmitting leads and means for connecting the power leads to the primary windings, a source of direct current and means for connecting the field windings to the source of direct current, a thyratron tube having an anode, a cathode, and a control grid, means for connecting the anode and cathode to be energized as a function of the voltage across one of the phases of the said leads, a current transformer interconnected with one of the said load leads, an adjustable loading resistor connected across the secondary terminals of said current transformer, one terminal of the current transformer being connected to the control grid and the other terminal being connected to said cathode, whereby the firing of said thyratron tube is controlled as a function of the power factor of said synchronous machine, an exciter, a booster generator, said booster generator having a field winding connected in the circuit of the cathode and anode, said exciter being connected to the field windings of the synchronous machine, excitation control means for exciting the booster generator as a function of the exciter voltage so that the output of the booster generator is zero at a selected power factor of said synchronous machine, said booster generator being also interconnected with the field windings of the synchronous machine whereby variations of the field current in the field winding of the booster generator connected in the anode cathode circuit of said thyratron tube because of changes in power factor alters the output of the booster generator from zero in such a sense that variations in power factor of said synchronous machine are substantially eliminated.

3. In an electric system of control for a synchronous machine, in combination, a synchronous machine having a polyphase primary winding and having field windings for excitation by direct current, electric power transmitting leads and means for connecting the power leads to the primary windings, a source of direct current and means for connecting the field windings to the source of direct current, a thyratron tube having an anode, a cathode, and a control grid, means for connecting the anode and cathode to be energized as a function of the voltage across one of the phases of the said leads, a current transformer interconnected with one of the said load leads, an adjustable current limiting resistor, one terminal of the current transformer being connected through said current limiting resistor to the control grid and the other terminal being connected to said cathode, whereby the firing of said thyratron tube is controlled as a function of the power factor of said synchronous machine, an exciter, a booster generator, said booster generator having a field winding connected in the circuit of the cathode and anode, said exciter being connected to the field windings of the synchronous machine, excitation control means for exciting the booster generator as a function of the exciter voltage so that the output of the booster generator is zero at a selected power factor of said synchronous machine, said booster generator being also interconnected with the field windings of the synchronous machine whereby variations of the field current in the field winding of the booster generator connected in the anode cathode circuit of said thyratron tube because of changes in power factor alters the output of the booster generator from zero in such a sense that variations in power factor of said synchronous machine are substantially eliminated.

4. In an electric system of control for a synchronous machine, in combination, a synchronous machine having a polyphase primary winding and having field windings for excitation by direct current, electric power transmitting leads and means for connecting the power leads to the primary windings, a source of direct current and means for connecting the field windings to the source of direct current, a thyratron tube having an anode, a cathode, and a control grid, means for connecting the anode and cathode to be energized as a function of the voltage across one of the phases of the said leads, a current transformer interconnected with one of the said load leads, an adjustable loading resistor connected across the secondary terminals of said current transformer, an adjustable current limiting resistor, one terminal of the current transformer being connected through said current limiting resistor to the control grid and the other terminal being connected to said cathode, whereby the firing of said thyratron tube is controlled as a function of the power factor of said synchronous machine, an exciter, a booster generator, said booster generator having a field winding connected in the circuit of the cathode and anode, said exciter being connected to the field windings of the synchronous machine, excitation control means for exciting the booster generator as a function of the exciter voltage, means for adjusting the excitation control means, so that the output of the booster generator is zero at a selected power factor of said synchronous machine, said booster generator being also interconnected with the field windings of the synchronous machine whereby variations of the field current in the field winding of the booster generator connected in the anode cathode circuit of said thyratron tube because of changes in power factor alters the output of the booster generator from zero in such a sense that variations in power factor of said synchronous machine are substantially eliminated.

5. In an electric system of control for a synchronous machine, in combination, a synchronous machine having a polyphase primary winding and having field windings for excitation by direct current, electric power transmitting leads and means for connecting the power leads to the primary windings, a source of direct current and means for connecting the field windings to the source of direct current, a thyratron tube having an anode, a cathode, and a control grid, means for connecting the anode and cathode to be energized as a function of the voltage across one of the phases of the said leads, a current transformer interconnected with one of the said load leads, one terminal of the current transformer being connected to the control grid and the other terminal being connected to said cathode, whereby the firing of said thyratron tube is controlled as a function of the power factor of said synchronous machine, a balanced Wheatstone bridge circuit, said field windings of the synchronous machine being divided in two substantially equal sections, said sections being connected, respectively, in two of the opposite legs of the bridge circuit, impedance means in the other two opposite legs, an exciter connected to two opposite junctions of the bridge, a regulating generator, having a tuning field connected in circuit relation with the regulating generator armature, connected to the balanced junctions of the bridge, a pattern field, having an adjustable resistor connected in series with the pattern field, for the regulating generator, said pattern field being connected to the exciter to be excited at a selected value as a function of the voltage of the exciter, a regulating field for the regulating generator connected in series with the anode circuit of said thyratron tube to thus produce an excitation effect in said regulating field as a function of the power factor of said synchronous machine, the excitation effects of the regulating generator being adjusted to maintain constant power factor of said synchronous machine.

6. In an electric system of control for a synchronous machine, in combination, a synchronous machine having a polyphase primary winding and having field windings for excitation by direct current, electric power transmitting leads and means for connecting the power leads to the primary windings, a source of direct current and means for connecting the field windings to the source of direct current, a thyratron tube having an anode, a cathode, and a control grid, means for connecting the anode and cathode to be energized as a function of the voltage across one of the phases of the said leads, a current transformer interconnected with one of the said load leads, an adjustable loading resistor connected across the secondary terminal of said current transformer, one terminal of the current transformer being connected to the control grid and the other terminal being connected to said cathode, whereby the firing of said thyratron tube is controlled as a function of the power factor of said synchronous machine, a balanced Wheatstone bridge circuit, said field windings of the synchronous machine being divided in two substantially equal sections, said sections being connected, respectively, in two of the opposite legs of the bridge circuit, impedance means in the other two opposite legs, an exciter connected to two opposite junctions of the bridge, a regulating generator, having a tuning field connected in circuit relation with the regulating generator armature, connected to the balanced junctions of the bridge, a pattern field, having an adjustable resistor connected in series with the pattern field, for the regulating generator, said pattern field being connected to the exciter to be excited at a selected value as a function of the voltage of the exciter, a regulating field for the regulating generator connected in series with the anode circuit of said thyratron tube to thus produce an excitation effect in said regulating field as a function of the power factor of said synchronous machine, the excitation effects of the regulating generator being adjusted to maintain constant power factor of said synchronous machine.

7. In an electric system of control for a synchronous machine, in combination, a synchronous machine having a polyphase primary winding and having field windings for excitation by direct current, electric power transmitting leads and means for connecting the power leads to the primary windings, a source of direct current and means for connecting the field windings to the source of direct current, a thyratron tube having an anode, a cathode, and a control grid, means for connecting the anode and cathode to be energized as a function of the voltage across one of the phases of the said leads, a current transformer interconnected with one of the said load leads, one terminal of the current transformer being connected to the control grid and the other terminal being connected to said cathode, whereby the firing of said thyratron tube is controlled as a function of the power factor of said synchronous machine, a balanced Wheatstone bridge circuit, said field windings of the synchronous machine being divided in two substantially equal sections, said sections being connected, respectively, in two of the opposite legs of the bridge circuit, impedance means in the other two opposite legs, an exciter connected to two opposite junctions of the bridge, a regulating generator connected in circuit relation with the other or balanced junctions of the bridge, excitation means for the regulating generator including one field winding connected in the anode circuit of said tube to thus produce an effect as a function of the power factor of said synchronous machine and including excitation windings energized as a function of certain other electric operating characteristics of the electric system of control, the adjustment of the excitation means for the regulating generator being such that the output of the regulating generator is zero for a selected power factor of the synchronous machine but with power factor changes produces a compensating voltage to maintain the power factor constant.

ALPHEUS J. DOLAN.

REFERENCES CITED

The following references are of record in the file of this patent:

UNITED STATES PATENTS

| Number | Name | Date |
|---|---|---|
| 2,021,161 | Verman | Nov. 19, 1935 |
| 2,057,490 | Jenks | Oct. 13, 1936 |
| 2,195,116 | Modlinger | Mar. 26, 1940 |